United States Patent [19]

Sugimori et al.

[11] Patent Number: 5,289,269
[45] Date of Patent: Feb. 22, 1994

[54] COLOR TELEVISION CAMERA WITH DETAILS OF LUMINANCE SIGNAL FORMATION

[75] Inventors: Yoshio Sugimori; Yoshihide Kimata, both of Tokyo; Tadao Kurosaki, Kamakura, all of Japan

[73] Assignee: Nippon Television Network Corporation, Tokyo, Japan

[21] Appl. No.: 862,739

[22] Filed: Apr. 3, 1992

[30] Foreign Application Priority Data

Dec. 27, 1991 [JP] Japan .................... 3-346408

[51] Int. Cl.⁵ .................... H04N 9/04; H04N 5/225
[52] U.S. Cl. .................... 348/264; 348/265
[58] Field of Search .................... 358/41, 43, 50, 52, 358/334; H04N 9/09, 5/225

[56] References Cited

U.S. PATENT DOCUMENTS

| 4,725,881 | 2/1988 | Buchwald | 358/50 |
| 4,829,368 | 5/1989 | Kobayashi et al. | 358/334 X |
| 5,119,208 | 6/1992 | Fujimoto | 358/906 X |

FOREIGN PATENT DOCUMENTS

| 62-206897 | 9/1987 | Japan | H04N 9/09 |
| 1-140886 | 6/1989 | Japan | H04N 9/09 |

Primary Examiner—Mark R. Powell
Attorney, Agent, or Firm—Dellett and Walters

[57] ABSTRACT

A high quality non-interlaced television signal is generated without using a large size circuit. Interlaced television signals are obtained from four image pickup devices. A luminance or green signal in the interlaced television signals consists of two interlaced channels. These two channel luminance or green signals are simply combined to produce the non-interlaced signal without modifying the driving frequency of the image pickup devices.

45 Claims, 9 Drawing Sheets

EXAMPLE OF INTERLACED SCAN

FIG. 10A (PRIOR ART)

EXAMPLE OF INTERLACED SCAN

FIG. 10B (PRIOR ART)

EXAMPLE OF NON-INTERLACED SCAN

FIG. 11A (PRIOR ART)

EXAMPLE OF NON-INTERLACED SCAN

FIG. 11B (PRIOR ART)

COLOR TELEVISION CAMERA WITH DETAILS OF LUMINANCE SIGNAL FORMATION

BACKGROUND OF THE INVENTION

The present invention relates to a high resolution television camera that can be applied to a single combination unit of a VTR and a television camera.

One of conventional television cameras is a three-plane type having CCDs as image pickup devices. This television camera generates R(red), G(green) and B(blue) primary color interlaced signals from the CCDs.

Figure 10A:
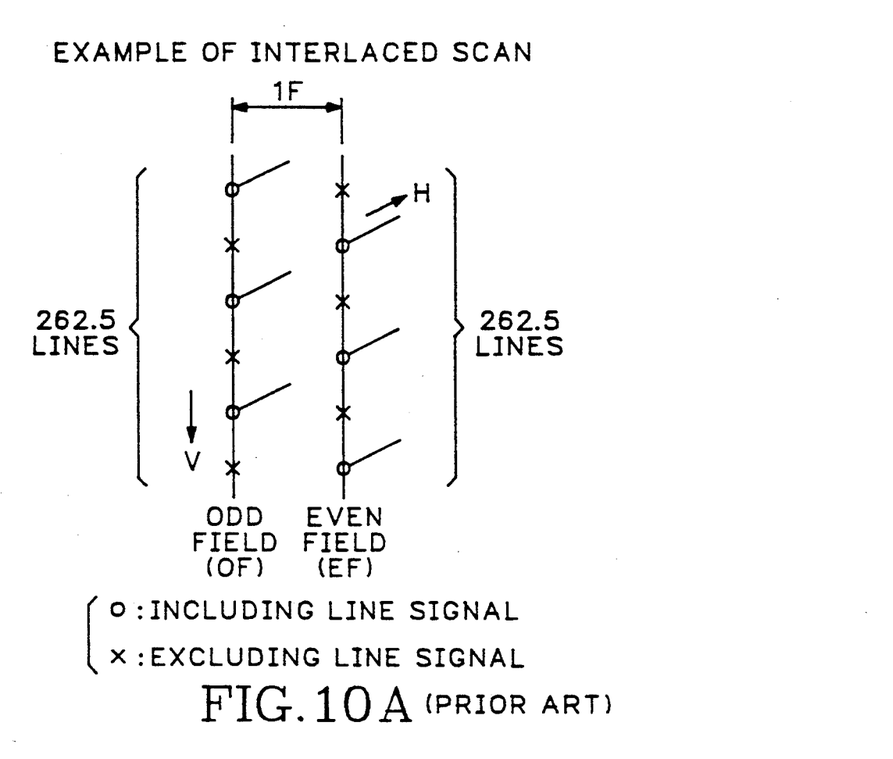
FIGS. 10A and 10B shows a diagram for explaining an interlaced scanning.
Figure 10B:
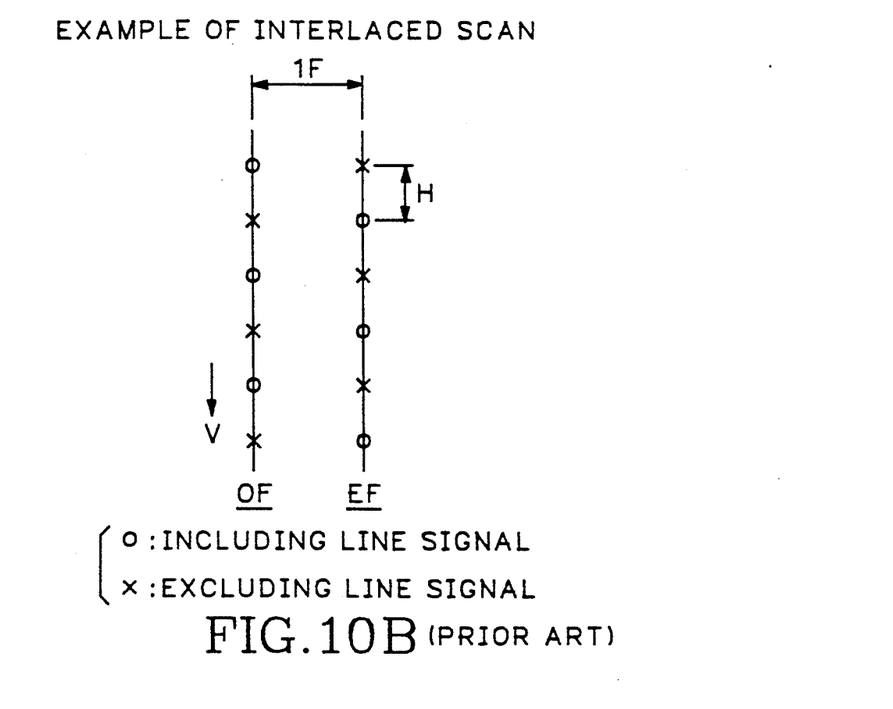

In the case of an NTSC television signal, each odd field consists of 262.5 interlaced signals (line signals) as shown in FIG. 10A. Moreover, each even field consists of 262.5 interlaced signals that are shifted by ½ pixel vertically as shown in FIG. 10B.

Figure 11A:
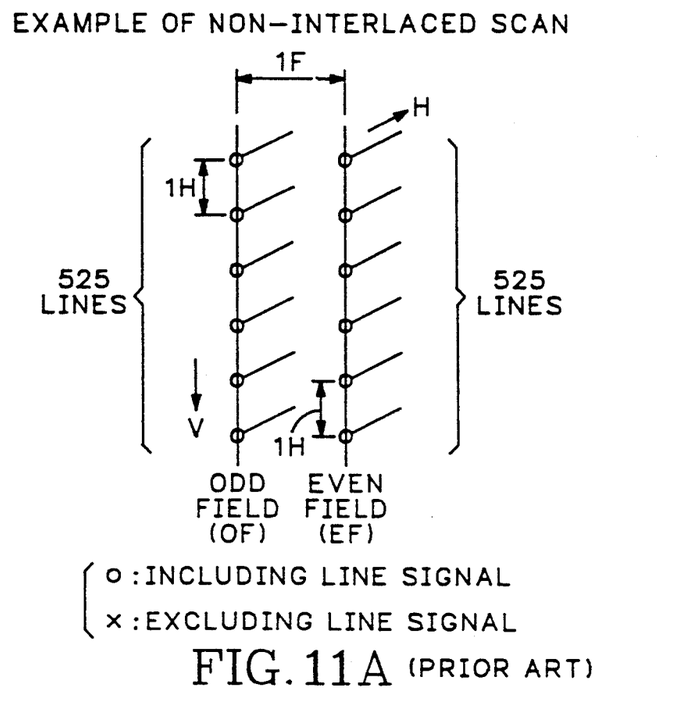
FIGS. 11A and 11B shows a diagram for explaining a non-interlaced scanning.
Figure 11B:
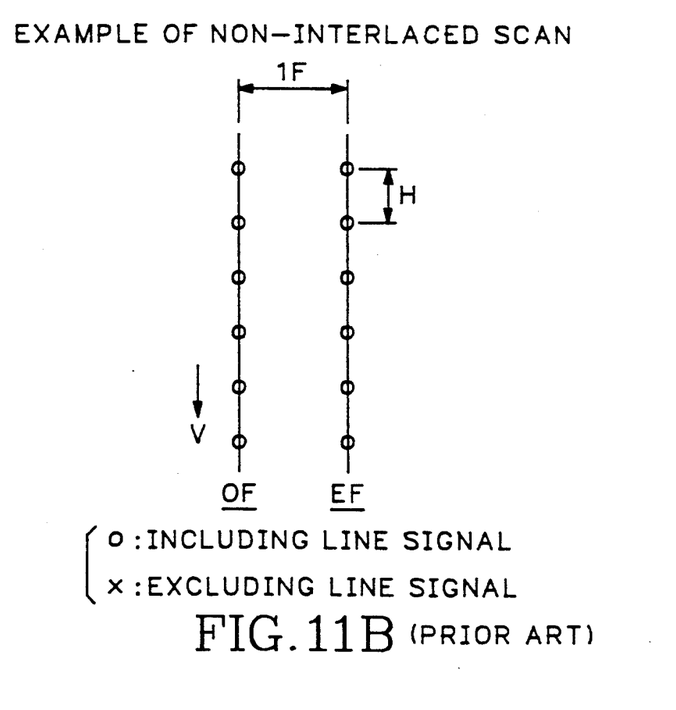

When an image is reproduced by a non-interlaced signal shown in FIG. 11A, the vertical image resolution is increased and image quality is improved very much. Recently, the non-interlaced system is desired.

There are two ways to generate the non-interlaced signal. The first way is based on the image pickup system of the television camera. The second way is based on a signal Processing system. The image pickup system is constructed to produce 525 line signals per field. The signal processing system interpolates between adjacent line signals.

In the case of the image pickup system for producing 525 line signals per field, driving frequencies for horizontal and vertical scanning (horizontal and vertical transfer frequencies) are double the interlaced scanning frequencies. Thus, a circuit becomes large and is expensive.

A compact unit having light weight and low power consumption is proper for a single combination unit consisting of a VTR (video tape recorder) and a television camera used for news gathering. However, it is difficult to apply the above discussed means to the single combination unit of the VTR and television camera.

The above discussed interpolation processing means should produce the non-interlaced signal by using the adjacent line signals, but that the vertical resolution may not reach an expected value. Thus, this interpolation processing means has an image quality less than the above discussed optical system and is not appropriate for the single combination unit of the VTR and the television camera for news gathering.

What is desired is a television camera that is free from the aforementioned disadvantages of the prior art. This desired television camera does not require a large size circuit. The desired television camera can accomplish the high resolution or non-interlaced system by using a conventional television camera construction.

SUMMARY OF THE INVENTION

According to the first aspect of the present invention, a television signal from image pickup devices is an interlaced signal. In the interlaced signal, two channels of a luminance signal or a green signal are included.

The spatial positions of the two image pickup devices for the two channels of the luminance or green signals may be shifted from each other by half the vertical pixel pitch. If these two channel signals are derived from a single image pickup device, the spatial positions of the two signals may be shifted from each other by half the vertical pixel pitch.

According to the second aspect of the present invention, a television signal from image pickup devices is an interlaced signal. In the interlaced signal, two channels of the luminance or green signal are included. A recording and playback section is positioned in the single combination unit of the VTR and the television camera. This recording and playback section records each of the two channels of the interlaced luminance or green signal as an independent channel.

The image resolution of the television signal depends on the luminance signal or the green signal that supports an outline (edge) of an image. This invention considers this fact and is arranged to generate the non-interlaced signal of the luminance or green signal.

In the first aspect of the present invention, two CCDs are provided for the luminance signal. A line signal from each of the CCDs is the interlaced signal. However, the spatial position of one luminance signal (Y) from one image pickup system is vertically shifted with respect to that of the other luminance signal (Yo) by ½ the vertical pixel pitch (=P/2).

When the odd field (OF) condition of the interlaced luminance signal Y is as shown in FIG. 4A, that of the interlaced luminance signal Yo is as shown in FIG. 4B. The lines of these interlaced luminance signals Y and Yo are shifted from each other by P/2. Thus, the non-interlaced signal Y' shown in FIG. 4C can be obtained by combining the interlaced luminance signals Y and Yo alternately. The even field (EF) conditions of the luminance signals Y and Yo are similar to the odd field (OF) thereof.

The second aspect of the present invention relates to the single combination unit of the VTR and the television camera. The VTR inside the unit acts as the recording and playback section.

The present invention is pointed out with particularity in the appended claims. Objects and advantages of the present invention will become apparent to those having ordinary skill in the art when taken in conjunction with the accompanying drawings.

DETAILED DESCRIPTION OF THE INVENTION

The television camera according to the present invention will be discussed by reference to the attached drawings.

The present invention can apply to a television camera or a single combination unit of a VTR and the television camera. In each the case, the present invention is arranged to derive a non-interlaced signal for a luminance signal or a green signal that supports an outline of an image. According to the first aspect of the present invention, two channels of an image pickup system are provided for a luminance signal Y or a green signal G. Moreover, the invention generates two interlaced signals that are shifted from each other by P/2 in a spatial position. According to the second aspect of the present invention, two channel interlaced signals can be obtained from a single image pickup system similarly to the first aspect by providing a single image pickup system for the two channel luminance or green signals.

Figure 1:
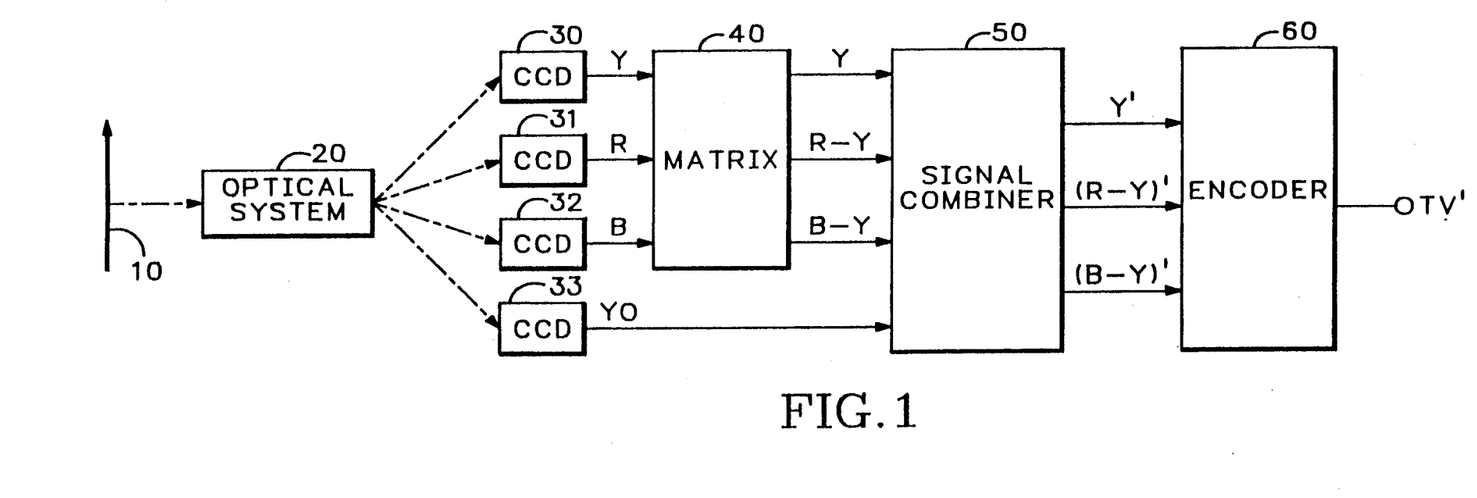
FIG. 1 shows a block diagram of one embodiment of a television camera according to the present invention.

FIG. 1 shows one embodiment of the television camera to which the first aspect of the present invention is applied. This embodiment can be constructed by modifying a conventional three-plane type television camera. In this embodiment, four CCDs are used as the image pickup devices. An optical image 10 of a subject is focused through an optical system 20 on CCDs 30, 31, 32 and 33. The CCD 30 generates the luminance signal Y (first channel luminance signal), the CCD 31 generates a red primary color signal R and the CCD 32 generates a blue primary color signal B. Moreover, the CCD 33 generates the luminance signal Yo (second channel luminance signal).

Figure 2:
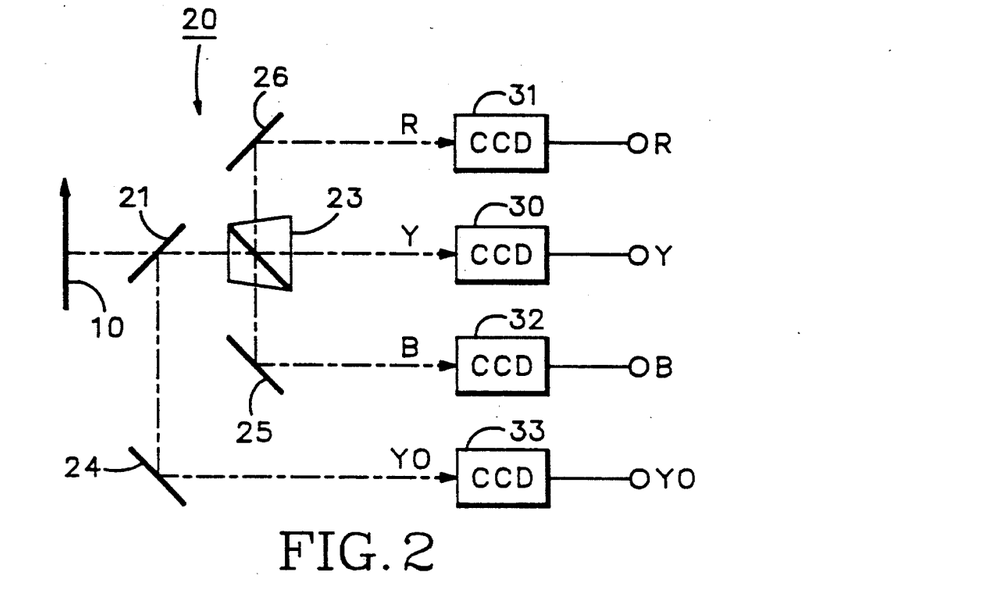
FIG. 2 shows a block diagram of one example of an optical system.

FIG. 2 shows an embodiment of the optical system 20. This optical system 20 includes a half mirror 21, a spectral diffraction system (prism) 23 and mirrors 24, 25 and 26. As a result, color separation images R, B and Y (monochrome image) are focused on the CCDs 30 through 33. The shown optical system 20 is only one example.

Each of the CCDs 30 through 33 generates the interlaced signal. Thus, horizontal and vertical driving systems of these CCDs 30 through 33 may be the same as the systems for the conventional television camera.

The luminance signal Y and the primary color signals R and B of the image pickup devices are applied to a matrix circuit 40 that generates the luminance signal Y and color difference signals R-Y and B-Y of the NTSC system. A signal combination processing circuit (signal combiner) 50 receives the first channel luminance signal Y, the pair of color difference signals R-Y and B-Y and the second channel luminance signal Yo. The luminance signals are processed to produce the non-interlaced luminance signal. The color difference signals are processed to generate the non-interlaced color difference signals by using the signals on the adjacent lines for the interpolation. An encoder 60 produces a high quality television signal TV' from the output signals of the signal combiner 50.

The high quality television signal TV' will be further discussed. The non-interlaced process for the luminance signal is as follows.

Figure 3:
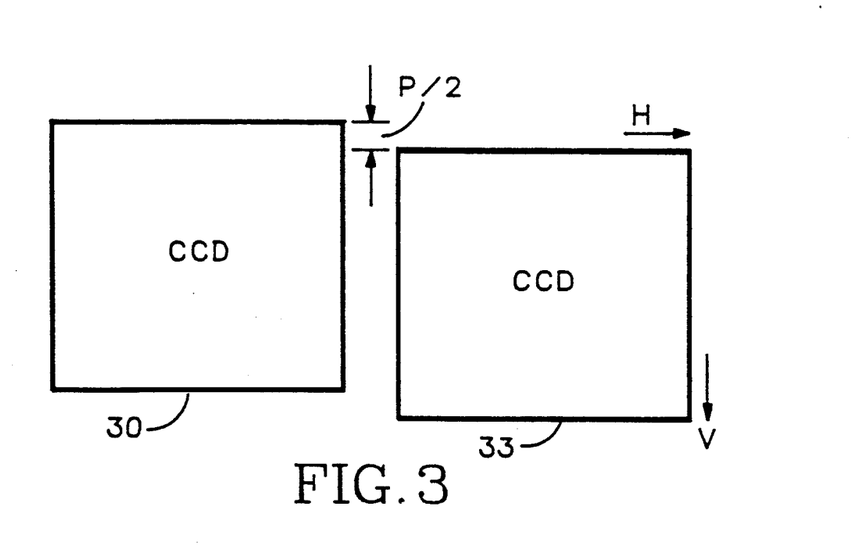
FIG. 3 shows a relative spatial position of CCDs.

As shown in FIG. 3, the spatial position of the CCD 30 for the luminance signal Y is shifted from the CCD 33 for the luminance signal Yo by the half pixel pitch P/2 in a vertical direction V.

Figure 4:
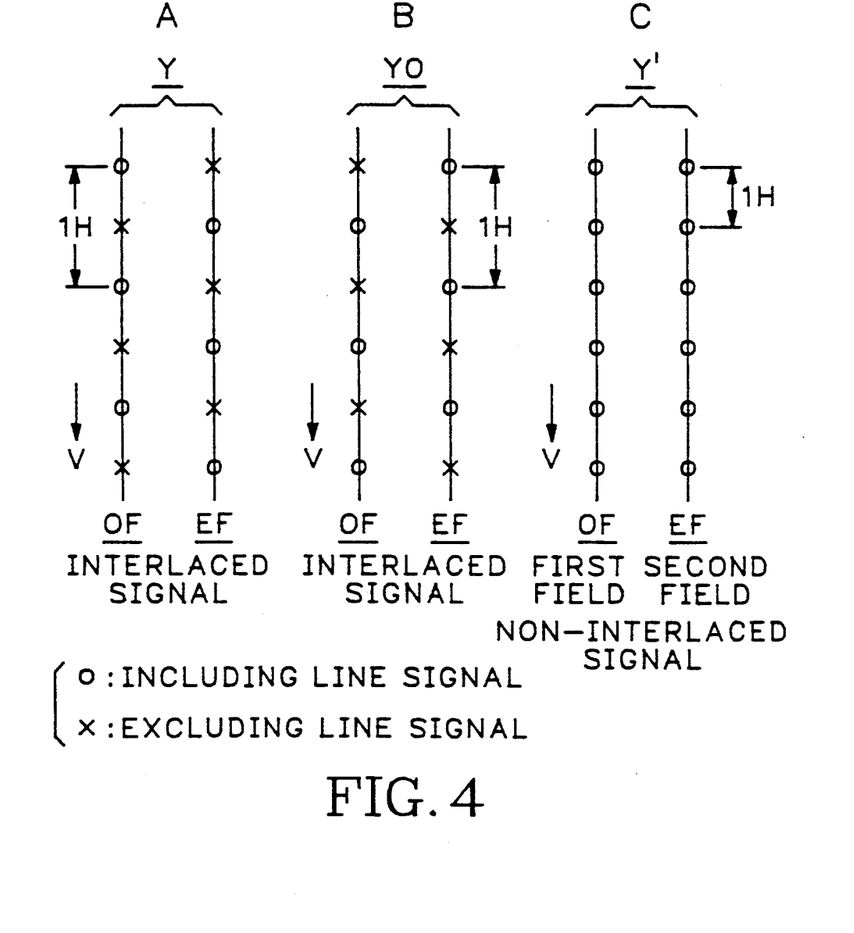
FIG. 4 shows a non-interlace process.

As a result, when the CCDs 30 and 33 are driven simultaneously, the CCDs 30 and 33 sample different spatial positions. Thus, the output line signal represents image information of different lines shifted by half pixel pitch (P/2). This condition is shown in FIG. 4 wherein "O" represents that the line interlaced signal exists.

When the luminance signal Y includes the interlaced signal (O) in the odd field (OF) as shown in FIG. 4A, the luminance signal Yo includes the interlaced signal in the odd field as shown in FIG. 4B. These interlaced signals are offset by P/2 in the vertical direction.

By using these luminance signals alternately, the non-interlaced luminance signal Y' can be derived in the odd field (first field) as shown in FIG. 4C. The line interval of this non-interlaced luminance signal is the half pixel pitch (P/2).

In the even field (EF), two channel luminance signals Y and Yo (FIGS. 4A and 4B) can be obtained by sampling different spatial positions simultaneously with the interlaced scanning. These luminance signals Y and Yo are used alternately to generate the non-interlaced luminance signal Y' of the second field as shown in FIG. 4C.

The color signal is processed as follows to generate the non-interlaced signal. The color difference signals R-Y and B-Y obtained for the odd field period may be used to generate the non-interlaced color difference signals for the 262.5 remainder lines in the odd field. The color difference signals in the even field may be processed similarly to the odd field. In this instance, the color difference signals of the former line can be used as the next non-interlaced line. On the other hand, a new signal may be obtained by interpolating (or averaging) the color difference signals of the adjacent lines. In this instance, the original and new signals can be used as the color difference signals of the non-interlaced line. Of course, the non-interlaced color difference signals may be formed by field interpolation.

The non-interlaced color difference signals (R-Y)' and (B-Y)' are formed by the shifting process or the interpolation process as discussed hereinbefore. This reason is that human eye sensitivity for the color component is much less than that for the luminance component. Thus, this process does not reduce the image quality for the color components.

The above discussed signal process is done by the signal combination processing circuit 50. The processed non-interlaced signals Y', (R-Y)' and (B-Y)' are applied to the encoder 60 which generates the NTSC type high quality non-interlaced television signal (composite television signal) TV'.

Figure 5:
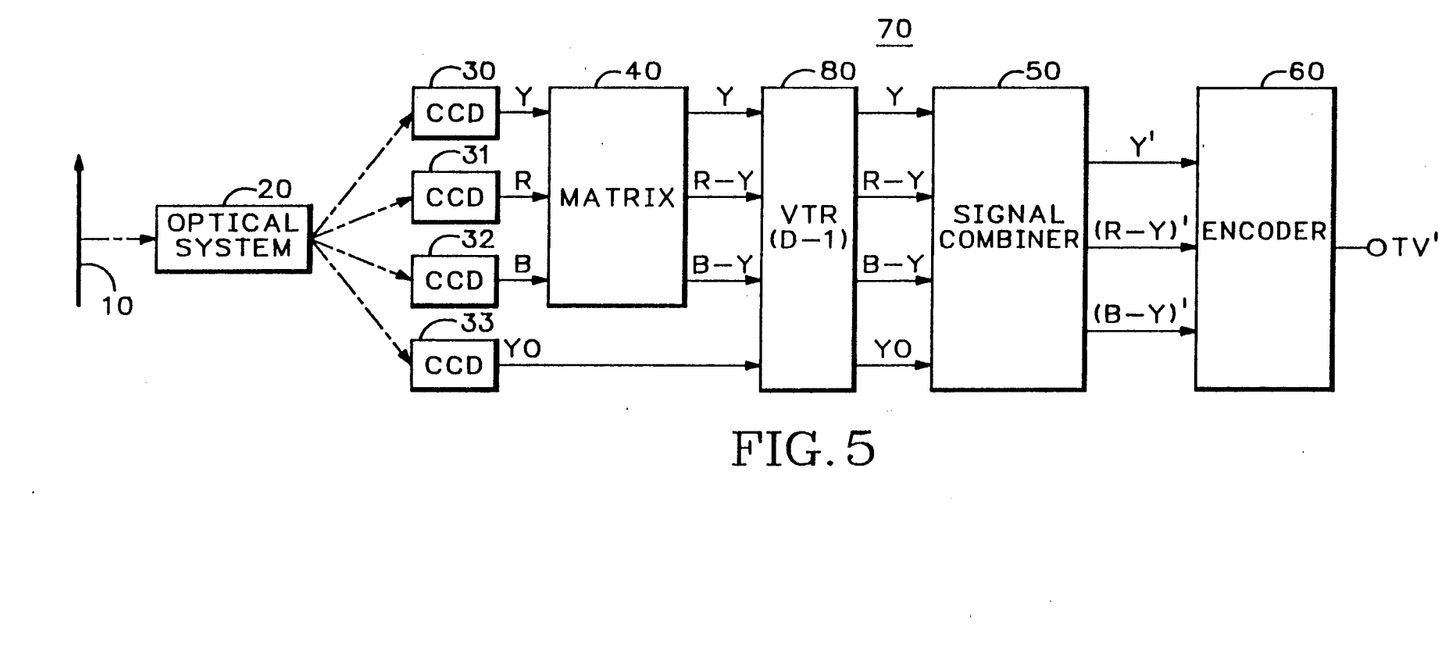
FIG. 5 shows a block diagram of another embodiment in which the present invention is applied to a single combination unit of a VTR and a television camera.

FIG. 5 is a block diagram of one embodiment wherein the present invention is applied to a single combination unit 70 of the VTR and the television camera. In this embodiment, a VTR 80 as a recording and playback section receives the luminance signal Y and the pair of color difference signals R-Y and B-Y from the matrix circuit 40 and further receives the second channel luminance signal Yo. Each of the signals is independently recorded in each channel.

The VTR 80 may be a slight modification of the D1 format digital VTR which can record and reproduce the component television signals. This modified VTR may be constructed by adding a recording and playback system (including a recording/playback magnetic head system) for the luminance signal Yo to the D1 format recording and playback system (for recording and reproducing the luminance signal and the pair of color difference signals PB and PR). Thus, this modified VTR is a digital VTR for a new format recording and playback.

In this instance, the luminance signal Yo is sampled by, for example, a sampling frequency (13.5 MHz) for the luminance signal Y and the sampled signal is digitized. Then, the digitized signal is processed for many objects (shuffle process, error correction process, etc.). This new type four-channel recording/playback VTR can be called 4:4:2:2 type digital VTR.

Only the high frequency components of the luminance signal Yo may be recorded as the luminance signal Yo. In this instance, the sampling frequency may be 6.75 MHz that is a half frequency of the luminance signal Y. The VTR for this case can be called 4:2:2:2 digital VTR.

A difference signal (line signal) between the luminance signals Y and Yo may be recorded instead of the second luminance signal Yo. Instead of recording the luminance signal Yo from the second channel by the VTR 80 with respect to the luminance signal Y from the first channel, the VTR may record the difference line signal between the luminance signals Yo and Y. In this instance the line number of the luminance signal Y of the first channel should correspond to the line number of the luminance signal Yo of the second channel.

In order to produce the non-interlaced signal, the difference line signal (n-th line) [delta] Yo(n) should be as follows:

$$[delta]Yo(n) = Yo(n) - \{Y(n) + Y(n+1)\}/2$$

The VTR 80 records this difference line signal [delta] Yo as well as the other interlaced signals. This process reduces the frequency band of the signals to be recorded. This is very effective.

The signal combination processing circuit 50 receives four reproduced channels of the luminance signal Y and the pair of color difference signals R-Y and B-Y as well as the different channel luminance signal Yo. The circuit 50 processes these signals for obtaining the non-interlaced signals as discussed hereinbefore. Then, the encoder 60 generates the NTSC type high quality television signal TV'.

Figure 6:
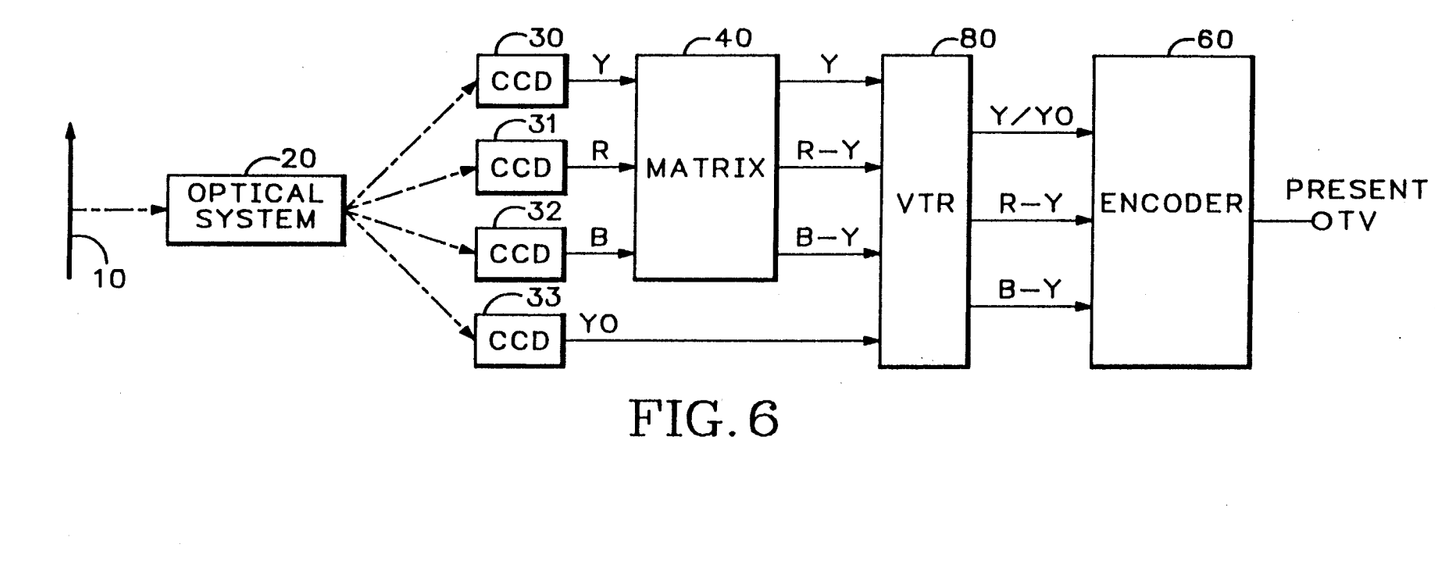
FIG. 6 shows a block diagram of an additional embodiment of the single combination unit of the VTR and the television camera.

The television camera shown in FIG. 6 may generate a current type television signal TV instead of the high quality television signal TV'. The encoder 60 uses the luminance signal Y or Yo and the pair of color difference signals R-Y and B-Y to produce the current type television signal TV. Either one of the luminance signals Y and Yo may be used.

In the single combination unit 70 of the VTR and the television camera, the signal combination processing circuit 50 and the encoder 60 may be provided in different units. Thus, the television camera 70 can be more compact and the portability may be improved.

The outline component of the image may be represented by the green component of the primary color components instead of the luminance component. When the green signal is used, the optical system 20 can be constructed as shown in FIG. 7.

Figure 7:
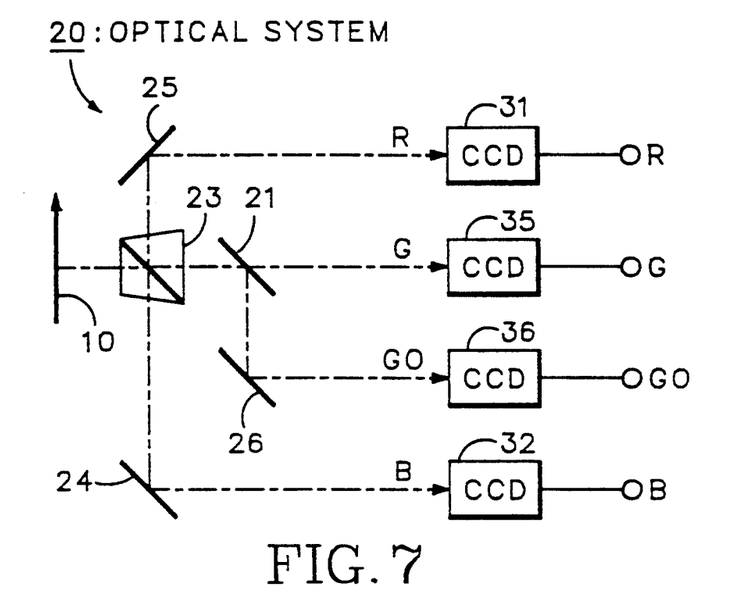
FIG. 7 shows an optical system and an image pickup system to produce a green signal.

In FIG. 7, the optical system 20 consists of the half mirror 23, the spectral diffraction system (prism) 23 and the three mirrors 24, 25 and 26. The CCDs 31 and 32 generate the R and B primary color signals respectively. The CCDs 35 and 36 are spatially positioned as shown in FIG. 3. Thus, the CCD 35 generates one channel green signal G (corresponding to the luminance signal Y) and the CCD 36 generates another channel green signal Go (corresponding to the luminance signal Yo).

As a result, the non-interlaced signal can be generated by using the green signal instead of the luminance signal.

The above described embodiments use two CCDs to generate two channel luminance signals or the green signals. The next embodiment can produce two channel luminance signals or the green signals by using a single image pickup device.

Figure 8:
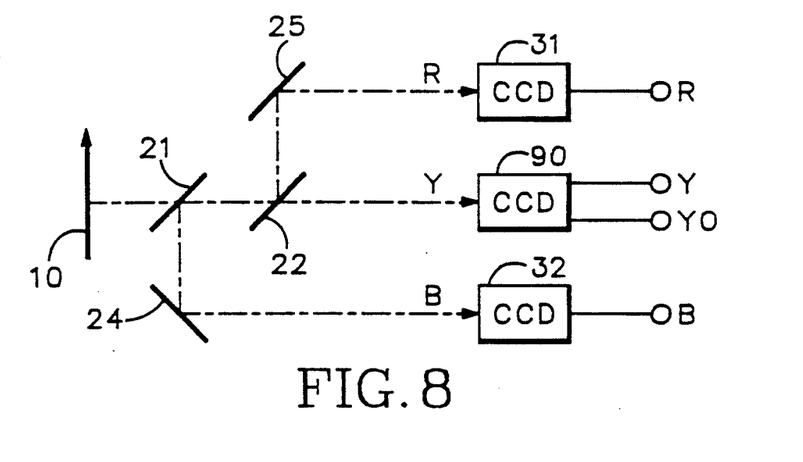
FIG. 8 shows a block diagram of a further embodiment of the television camera according to the present invention.

FIG. 8 shows a block diagram of another embodiment that produces the two channel signals by the single image pickup device. The optical system 20 is simply shown and consists of two half mirrors 21 and 24 and the mirrors 24 and 25. The CCDs 31 and 32 generate the primary color signals R and B. A CCD 90 generates two channel luminance signals Y and Yo (or the green signals G and Go).

Figure 9:
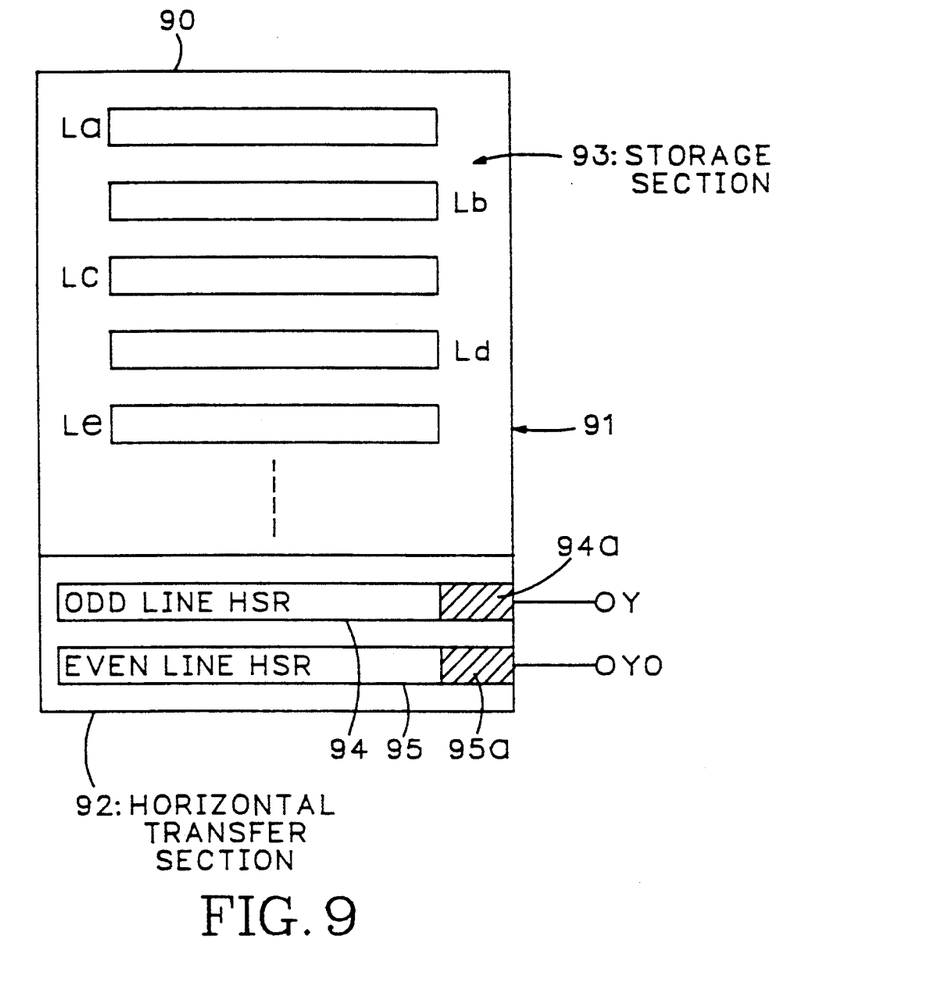
FIG. 9 shows one example of the CCD used in FIG. 8.

FIG. 9 shows an embodiment of the CCD 90 generating two channel luminance signals Y and Yo. In FIG. 9, the CCD 90 is an inter line transfer type (IT) CCD consisting of a charge storage section 91 and a horizontal transfer section (horizontal transfer register) 92.

The charge storage section 91 comprises pixel sensors arranged in the two-dimension and vertical transfer sections (vertical transfer registers) each arranged for the pixel sensor column connected vertically in a cascade. They are not shown.

Assuming that the pixel sensor row (called a horizontal line) arranged in a horizontal direction is labeled Li (i=0 through 525), odd number horizontal lines La, Lc, Le . . . transfer the charge to an odd line horizontal transfer section (HSR) 94. The transferred charge is converted into a signal voltage by a charge-to-voltage converter 94a that generates the luminance signal Y. Even number horizontal lines Lb, Ld, Lf . . . transfer the charge to an even line horizontal transfer section (HSR) 95. The transferred charge is converted into a signal voltage by a charge-to-voltage converter 95a that generates the luminance signal Yo.

The charges in the two adjacent odd and even horizontal lines (La, Lb), (Lc, Ld) . . . are read simultaneously once per horizontal period during the horizontal blanking period. The read charges are transferred to the corresponding horizontal transfer sections 94 and 95. The signal charges in the horizontal transfer sections 94 and 95 are read simultaneously for one horizontal period to generate the luminance signals Y and Yo.

The luminance signals Y and Yo are obtained by sampling the spatial positions shifted by P/2 as discussed hereinbefore. Thus, the above discussed signal process can accomplish the same result as that with two CCDs that are shifted by P/2 and generate the two signals.

According to this readout control, the single CCD 90 can produce two channel luminance signals having the interlaced relation by using the conventional driving system. The two horizontal lines can be read simultaneously by the conventional technology for the conventional CCDs. However, in the prior art, the signals from the horizontal transfer sections 94 and 95 are combined for use.

The luminance signals Y and Yo are processed as described hereinbefore to be converted into the non-interlaced high quality television signal TV'.

As being described hereinbefore, according to the television camera and the single combination unit of the VTR and the camera of the present invention, the interlaced video signals are derived from the image pickup devices. However, the luminance signal or the green signal included in the interlaced video signals consists of two channels.

According to this invention, two channel luminance signals can be generated without modifying the driving frequency for the conventional driving system of the image pickup device. It is relatively easy to form the non-interlaced signal because it can be formed merely by combining the signals.

In addition, according to the present invention, the high quality television signal can be produced by using the conventional image pickup and signal processing systems. Thus, the high quality television camera and the single combination unit of the VTR and the television camera may be compact and inexpensive.

Therefore, the present invention is appropriate for use in the television camera for the broadcasting station and the single combination unit of the VTR and the camera for news gathering. The invention is also useful with a television signal source of the current aspect ratio, the current EDTV and the next age EDTV of the aspect ratio 16:9.

While the preferred embodiments of the present invention have been shown and described herein, it will be apparent to those skilled in the art that many changes and modifications may be made without departing from the present invention in its broader aspect. For example, the present invention has been applied to the three-plate type television camera producing the primary color signals in the above discussed embodiments, however, this invention can be applied to a television camera generating signals excluding the primary color signals.

We claim:

1. A television camera comprising:
    a first image pickup device for receiving an optical image and generating a first luminance signal representative of image luminance on a first array of uniformly spaced scanning lines;
    a second image pickup device for receiving the optical image and generating a second luminance signal representative of image luminance on a second array of uniformly spaced scanning lines, said second array being offset from said first array by half the distance between the lines of said first array;
    a third image pickup device for receiving the optical image and generating a first color signal representative of a first color component on said first array of uniformly spaced scanning lines;
    a fourth image pickup device for receiving the optical image and generating a second color signal representative of a second color component on said first array of uniformly spaced scanning lines; and
    processing means for receiving said first luminance signal, said second luminance signal, said first color signal and said second color signal and generating a non-interlaced luminance signal, a first non-interlaced color difference signal representative of difference between said non-interlaced luminance signal and said first color signal, and a second non-interlaced color difference signal representative of difference between said non-interlaced luminance signal and said second color signal.

2. A television camera according to claim 1 wherein said processing means comprises matrix means for receiving said first luminance signal, said first color signal and said second color signal and generating a first interlaced color difference signal representative of difference between said first color signal and said first luminance signal, and a second interlaced color difference signal representative of difference between said second color signal and said first luminance signal.

3. A television camera according to claim 2 wherein said processing means further comprises signal combiner means for receiving said first luminance signal, said first interlaced color difference signal, said second interlaced color difference signal and said second luminance signal and generating said non-interlaced luminance signal, said first non-interlaced color difference signal and said second non-interlaced color difference signal.

4. A television camera according to claim 3 wherein said signal combiner means forms said first and second non-interlaced color signals by a shifting process.

5. A television camera according to claim 3 wherein said signal combiner means forms said first and second non-interlaced color signals by an interpolation process.

6. A television camera according to claim 2 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first luminance signal and a fourth channel for recording and playing back said second luminance signal.

7. A television camera according to claim 6 further comprising signal combiner means connected to said record and playback means for receiving said first luminance signal, said first interlaced color difference signal, said second interlaced color difference signal and said second luminance signal from said record and playback means and generating said non-interlaced luminance signal, said first non-interlaced color difference signal and said second non-interlaced color difference signal.

8. A television camera according to claim 2 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first luminance signal and a fourth channel for recording a signal representative of difference between said first luminance signal and said second luminance signal and playing back said second luminance signal.

9. A television camera according to claim 1 further comprising an encoder for receiving said non-interlaced luminance signal, said first non-interlaced color difference signal and said second non-interlaced color difference signal and producing a non-interlaced composite television signal.

10. A television camera according to claim 1 wherein said first, second, third and fourth image pickup devices comprise charge coupled devices.

11. A television camera comprising:
    a first image pickup device for receiving an optical image and generating a first luminance signal representative of image luminance on a first array of uniformly spaced scanning lines;
    a second image pickup device for receiving the optical image and generating a second luminance signal representative of image luminance on a second array of uniformly spaced scanning lines, said second array being offset from said first array by half the distance between the lines of said first array;

a third image pickup device for receiving the optical image and generating a first color signal representative of a first color component on said first array of uniformly spaced scanning lines;

a fourth image pickup device for receiving the optical image and generating a second color signal representative of a second color component on said first array of uniformly spaced scanning lines; and processing means for receiving said first luminance signal, said second luminance signal, said first color signal and said second color signal and generating an output luminance signal, wherein said output luminance signal is selectively one of either said first luminance signal or said second luminance signal, a first color difference signal representative of the difference between said first luminance signal and said first color signal and a second color difference signal representative of the difference between said first luminance signal and said second color signal.

12. A television camera according to claim 11 wherein said processing means comprises matrix means for receiving said first luminance signal, said first color signal and said second color signal and generating a first interlaced color difference signal representative of difference between said first color signal and said first luminance signal, and a second interlaced color difference signal representative of difference between said second color signal and said first luminance signal.

13. A television camera according to claim 12 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first luminance signal and a fourth channel for recording and playing back said second luminance signal.

14. A television camera according to claim 11 further comprising an encoder for receiving said output luminance signal, said first color difference signal and said second color difference signal and producing a composite television output signal.

15. A television camera according to claim 11 wherein said first, second, third and fourth image pickup devices comprise charge coupled devices.

16. A television camera comprising:

a first image pickup device for receiving an optical image and generating a first green signal representative of a green component on a first array of uniformly spaced scanning lines;

a second image pickup device for receiving the optical image and generating a second green signal representative of the green component on a second array of uniformly spaced scanning lines, said second array being offset from said first array by half the distance between the lines of said first array;

a third image pickup device for receiving the optical image and generating a first color signal representative of a first non-green component on said first array of uniformly spaced scanning lines;

a fourth image pickup device for receiving the optical image and generating a second color signal representative of a second non-green component on said first array of uniformly spaced scanning lines; and processing means for receiving said first green signal, said second green signal, said first color signal and said second color signal and generating a non-interlaced green signal, a first non-interlaced color difference signal representative of the difference between said non-interlaced green signal and said first color signal and a second non-interlaced color difference signal representative of difference between said non-interlaced green signal and said second color signal.

17. A television camera according to claim 16 wherein said processing means comprises matrix means for receiving said first green signal, said first color signal and said second color signal and generating a first interlaced color difference signal representative of difference between said first color signal and said first green signal, and a second interlaced color difference signal representative of difference between said second color signal and said first green signal.

18. A television camera according to claim 17 wherein said processing means further comprises signal combiner means for receiving said first green signal, said first interlaced color difference signal, said second interlaced color difference signal and said second green signal and generating said non-interlaced green signal, said first non-interlaced color difference signal and said second non-interlaced color difference signal.

19. A television camera according to claim 18 wherein said signal combiner means forms said first and second non-interlaced color signals by a shifting process.

20. A television camera according to claim 18 wherein said signal combiner means forms said first and second non-interlaced color signals by an interpolation process.

21. A television camera according to claim 17 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first green signal and a fourth channel for recording and playing back said second green signal.

22. A television camera according to claim 21 further comprising signal combiner means connected to said record and playback means for receiving said first green signal, said first interlaced color difference signal, said second interlaced color difference signal and said second green signal from said record and playback means and generating said non-interlaced green signal, said first non-interlaced color difference signal and said second non-interlaced color difference signal.

23. A television camera according to claim 17 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first green signal and a fourth channel for recording a signal representative of difference between said first green signal and said second green signal and playing back said second green signal.

24. A television camera according to claim 16 further comprising an encoder for receiving said non-interlaced green signal, said first non-interlaced color difference signal and said second non-interlaced color difference signal and producing a non-interlaced composite television signal.

25. A television camera according to claim 16 wherein said first, second, third and fourth image pickup devices comprise charge coupled devices.

26. A television camera comprising:
a first image pickup device for receiving an optical image and generating a first luminance signal representative of image luminance on a first array of uniformly spaced scanning lines and a second luminance signal representative of image luminance on a second array of uniformly spaced scanning lines, said second array being offset from said first array by half the distance between the lines of said first array;
a second image pickup device for receiving the optical image and generating a first color signal representative of a first color component on said first array of uniformly spaced scanning lines;
a third image pickup device for receiving the optical image and generating a second color signal representative of a second color component on said first array of uniformly spaced scanning lines; and
processing means for receiving said first luminance signal, said second luminance signal, said first color signal and said second color signal and generating a non-interlaced luminance signal, a first non-interlaced color difference signal representative of difference between said non-interlaced luminance signal and said first color signal, and a second non-interlaced color difference signal representative of difference between said non-interlaced luminance signal and said second color signal.

27. A television camera according to claim 26 wherein said processing means comprises matrix means for receiving said first luminance signal, said first color signal and said second color signal and generating a first interlaced color difference signal representative of difference between said first color signal and said first luminance signal, and a second interlaced color difference signal representative of difference between said second color signal and said first luminance signal.

28. A television camera according to claim 27 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first luminance signal and a fourth channel for recording a signal representative of difference between said first luminance signal and said second luminance signal and playing back said second luminance signal.

29. A television camera comprising:
a first image pickup device for receiving an optical image and generating a first luminance signal representative of a green component on a first array of uniformly spaced scanning lines and a second green signal representative of the green component on a second array of uniformly spaced scanning lines, said second array being offset from said first array by half the distance between the lines of said first array;
a second image pickup device for receiving the optical image and generating a first color signal representative of a first non-green color component on said first array of uniformly spaced scanning lines;
a third image pickup device for receiving the optical image and generating a second color signal representative of a second non-green color component on said first array of uniformly spaced scanning lines; and
processing means for receiving said first green signal, said second green signal, said first color signal and said second color signal and generating a non-interlaced green signal, a first non-interlaced color difference signal representative of difference between said non-interlaced green signal and said first color signal, and a second non-interlaced color difference signal representative of difference between said non-interlaced green signal and said second color signal.

30. A television camera according to claim 29 wherein said processing means comprises matrix means for receiving said first green signal, said first color signal and said second color signal and generating a first interlaced color difference signal representative of difference between said first color signal and said first green signal, and a second interlaced color difference signal representative of difference between said second color signal and said first green signal.

31. A television camera according to claim 30 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first green signal and a fourth channel for recording a signal representative of difference between said first green signal and said second green signal and playing back said second green signal.

32. A television camera according to claim 29 wherein said processing means further comprises signal combiner means for receiving said first luminance signal, said first interlaced color difference signal, said second interlaced color difference signal and said second luminance signal and generating said non-interlaced luminance signal, said first non-interlaced color difference signal and said second non-interlaced color difference signal.

33. A television camera according to claim 32 wherein said signal combiner means forms said first and second non-interlaced color signals by a shifting process.

34. A television camera according to claim 32 wherein said signal combiner means forms said first and second non-interlaced color signals by an interpolation process.

35. A television camera according to claim 27 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first luminance signal and a fourth channel for recording and playing back said second luminance signal.

36. A television camera according to claim 35 further comprising signal combiner means connected to said record and playback means for receiving said first luminance signal, said first interlaced color difference signal, said second interlaced color difference signal and said second luminance signal from said record and playback means and generating said non-interlaced luminance signal, said first non-interlaced color difference signal and said second non-interlaced color difference signal.

37. A television camera according to claim 26 further comprising an encoder for receiving said non-interlaced luminance signal, said first non-interlaced color difference signal and said second non-interlaced color difference signal and producing a non-interlaced composite television signal.

38. A television camera according to claim 26 wherein said first, second and third image pickup devices comprise charge coupled devices.

39. A television camera according to claim 30 wherein said processing means further comprises signal combiner means for receiving said first green signal, said first interlaced color difference signal, said second interlaced color difference signal and said second green signal and generating said non-interlaced green signal, said first non-interlaced color difference signal and said second non-interlaced color difference signal.

40. A television camera according to claim 39 wherein said signal combiner means forms said first and second non-interlaced color signals by a shifting process.

41. A television camera according to claim 39 wherein said signal combiner means forms said first and second non-interlaced color signals by an interpolation process.

42. A television camera according to claim 30 wherein said processing means further comprises a record and playback means connected to the matrix means, said record and playback means having a first channel for recording and playing back said first interlaced color difference signal, a second channel for recording and playing back said second interlaced color difference signal, a third channel for recording and playing back said first green signal and a fourth channel for recording and playing back said second green signal.

43. A television camera according to claim 42 further comprising signal combiner means connected to said record and playback means for receiving said first green signal, said first interlaced color difference signal, said second interlaced color difference signal and said second green signal from said record and playback means and generating said non-interlaced green signal, said first non-interlaced color difference signal and said second non-interlaced color difference signal.

44. A television camera according to claim 39 further comprising an encoder for receiving said non-interlaced green signal, said first non-interlaced color difference signal and said second non-interlaced color difference signal and producing a non-interlaced composite television signal.

45. A television camera according to claim 29 wherein said first, second and third image pickup devices comprise charge coupled devices.

* * * * *

UNITED STATES PATENT AND TRADEMARK OFFICE
CERTIFICATE OF CORRECTION

PATENT NO. : 5,289,269
DATED : February 22, 1994
INVENTOR(S) : Yoshio Sugimori et al.

It is certified that error appears in the above-identified patent and that said Letters Patent is hereby corrected as shown below:

Cover sheet, [75] Inventors: the third-named inventor, Tadao Kurosaki, listed as a resident of <u>Kamakura</u>, Japan, should be listed as a resident of <u>Kanagawa</u>, Japan.

Column 12, line 43, claim 32 should depend on claim 27, instead of claim 29.

Column 14, line 24, claim 44 should depend on claim 29, instead of claim 39.

Signed and Sealed this

Eleventh Day of October, 1994

*Attest:*

BRUCE LEHMAN

*Attesting Officer*      *Commissioner of Patents and Trademarks*